E. S. HUTCHINSON.
Automatic Feed for Carburetors.
No. 58,422.
Patented Oct. 2, 1866.
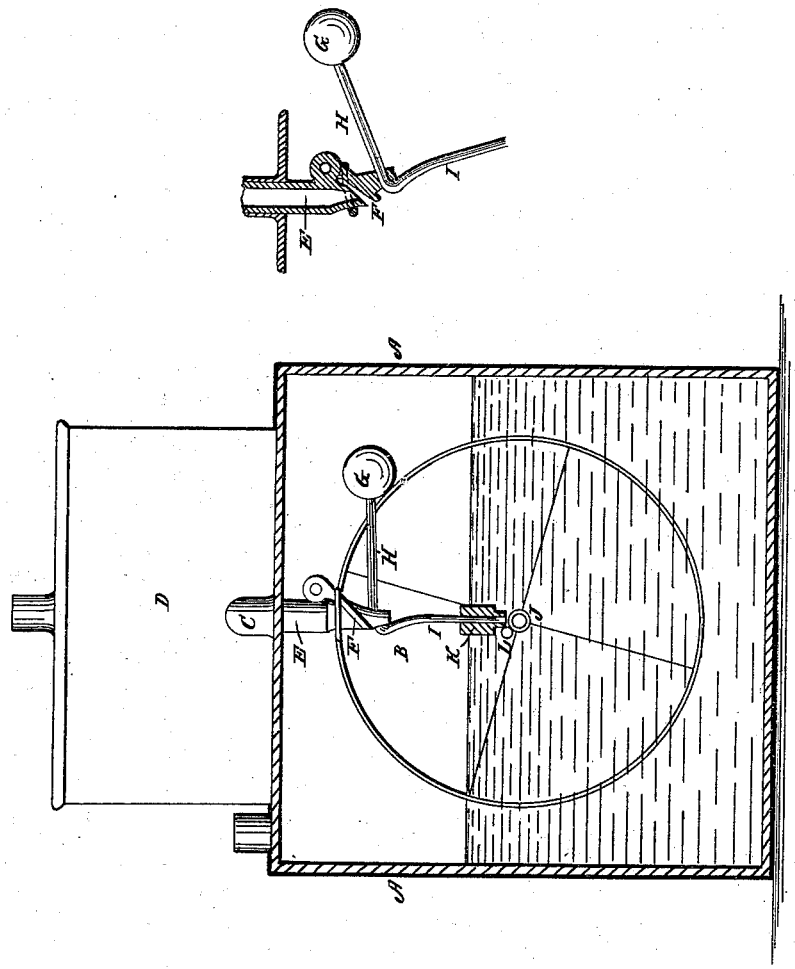

UNITED STATES PATENT OFFICE.

ELIAS S. HUTCHINSON, OF BALTIMORE, MARYLAND.

IMPROVED AUTOMATIC FEED FOR CARBURETERS.

Specification forming part of Letters Patent No. 58,422, dated October 2, 1866.

*To all whom it may concern:*

Be it known that I, ELIAS S. HUTCHINSON, of Baltimore, in the county of Baltimore and State of Maryland, have invented a new and useful Improvement in Automatic Feed for Carbureting Apparatus; and I do hereby declare the following to be a full, clear, and exact description of the same, sufficient to enable one skilled in the art to which the invention appertains to make use of it, reference being had to the accompanying drawing, which forms a part of this specification, and in which my invention is represented by a side elevation with the side of the chamber removed.

In my improvement the valve which regulates the ingress of hydrocarbon fluid into the chamber is operated by a projection on the shaft of the carbureting-wheel. A float on the arm of the valve comes within range of the projection when the fluid sinks below a certain level, so that each revolution of the shaft opens the valve a short space of time, but the rising of the float beyond the range of the projection makes the valve inoperative.

By this means the valve is automatically operated, the level of the fluid in the chamber determining the action of the valve.

In the drawing, A is the chamber, and B the carbureting-wheel, which revolves therein.

C is a pipe which leads the fluid from the reservoir D into chamber A.

E is a valve which is attached to a horizontal axis, and is kept in contact with its seat F by a weight, G, or an arm, H. Another arm, I, projects downward toward the shaft J of the revolving wheel B. Upon the arm I is a float, K, which floats upon the liquid, rising and falling upon the arm I as the fluid-level changes.

Upon the shaft J is a stud, L, which projects from the periphery of the shaft, and its purpose is to vibrate the valve upon its axis when the fluid sinks so low as to bring the float within range.

The lower end of the arm I does not come within the range of the stud L, but the float which slips thereon is made the means of operating the valve when the fluid sinks sufficiently to bring it within range.

Other means than the stud on the shaft may be applied, such as an eccentric enlargement; or the shaft may be made three or four square, so that the projecting angles will actuate the valve when the float sinks sufficiently low.

The valve-seat is faced with lead to make a tight joint.

This machine is to be applied to supercarbureting the ordinary carbureted hydrogen gas of the main, or to carbureting atmospheric air, and is to be driven either by the head of the gas or by mechanical devices, to produce the necessary rotary motion of the carbureting-wheel. It may be applied to keeping the water-chamber of a wet gas-meter supplied with water.

Having described my invention, what I claim therein as new, and desire to secure by Letters Patent, is—

A valve to regulate the supply of liquid from the reservoir to the chamber, which is operated from the revolving shaft, or a projection thereon, which strikes against an object brought within reach by the sinking of the fluid in the chamber.

ELIAS S. HUTCHINSON.

Witnesses:
W. H. HAYWARD,
JAMES J. WILSON.